(12) United States Patent
Tsutsui

(10) Patent No.: US 8,832,308 B2
(45) Date of Patent: Sep. 9, 2014

(54) DATA TRANSFER SYSTEM CAPABLE OF CONVERTING FILE FORMATS

(75) Inventor: Kyoya Tsutsui, Kanagawa-ken (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 509 days.

(21) Appl. No.: 11/899,098

(22) Filed: Sep. 4, 2007

(65) Prior Publication Data

US 2008/0059398 A1 Mar. 6, 2008

(30) Foreign Application Priority Data

Sep. 6, 2006 (JP) .................................. 2006-241857

(51) Int. Cl.
*G06F 15/16* (2006.01)
*G06F 17/30* (2006.01)

(52) U.S. Cl.
CPC .............................. *G06F 17/30569* (2013.01); *G06F 17/30017* (2013.01)
USPC ........................... 709/236; 709/231; 709/246

(58) Field of Classification Search
USPC .................................. 707/1; 709/246, 231, 236
See application file for complete search history.

(56) References Cited

U.S. PATENT DOCUMENTS

| | | | |
|---|---|---|---|
| 5,490,252 A * | 2/1996 | Macera et al. | 709/249 |
| 6,601,056 B1 * | 7/2003 | Kagle et al. | 1/1 |
| 7,000,136 B1 * | 2/2006 | Alexander et al. | 713/400 |
| 7,039,655 B2 * | 5/2006 | Kapczynski et al. | 1/1 |
| 7,495,808 B2 * | 2/2009 | Sasakuma et al. | 358/474 |
| 2001/0002470 A1 * | 5/2001 | Inohara et al. | 707/1 |
| 2002/0023247 A1 * | 2/2002 | Akiyama et al. | 714/758 |
| 2004/0098368 A1 * | 5/2004 | Sugawara et al. | 707/1 |
| 2004/0172376 A1 * | 9/2004 | Kobori et al. | 707/1 |
| 2004/0208255 A1 * | 10/2004 | Yoshida et al. | 375/260 |
| 2004/0221063 A1 * | 11/2004 | Mogul | 709/246 |
| 2005/0021859 A1 * | 1/2005 | Willian et al. | 709/246 |
| 2008/0059398 A1 * | 3/2008 | Tsutsui | 707/1 |

FOREIGN PATENT DOCUMENTS

| | | |
|---|---|---|
| JP | 2002-16639 | 1/2002 |
| JP | 2002-281483 | 9/2002 |
| JP | 2004-159079 | 6/2004 |
| JP | 2006-209336 | 8/2006 |

* cited by examiner

*Primary Examiner* — Viet Vu
*Assistant Examiner* — Keyvan Emdadi
(74) *Attorney, Agent, or Firm* — Frommer Lawrence & Haug LLP; William S. Frommer; Paul A. Levy

(57) ABSTRACT

In a data transfer system, when transferring data which has been transferred to a storage in a PC, to a mobile terminal connected to the PC, the PC acquires the file format of the data and the file format which can be processed by the mobile terminal and determines whether the conversion of the file format is necessary. When the conversion of the file format is necessary, the PC issues a request for a conversion to a format converter. The format converter acquires data from the PC and transfers the data back to the PC while performing conversion. The PC transfers the converted data to the mobile terminal.

17 Claims, 8 Drawing Sheets

FIG. 4

| NAME OF ARTICLE | MODEL NUMBER | FILE FORMAT |
|---|---|---|
| A | 11-AA11 | MP3 |
| A | 22-AA22 | MP3, AAC |
| A | 33-AA33 | MP3, AAC |
| B | 4BB-444 | WMA |
| B | 5BB-555 | MP3, WMA |
| ... | ... | ... |

402 — NAME OF ARTICLE
404 — MODEL NUMBER
406 — FILE FORMAT

400

DATA TRANSFER SYSTEM CAPABLE OF CONVERTING FILE FORMATS

BACKGROUND OF THE INVENTION

1. Field of the Invention

The present invention relates to information processing technology, and more particularly, to a data transfer system for transferring data to a device being connected, a data transfer apparatus, a method for transferring data adopted therein and a file format converter for converting the file format of the data.

2. Description of the Related Art

Outstanding developments of information processing technology and net work environment in recent years have made it possible to obtain contents, such as music or images, not only from recording media (CDs or DVDs) but also via a network. It has also made it possible for an individual to manage digital data, such as music or images easily by using a personal computer, a record reproducing apparatus or the like. One of the key technologies for implementing such an environment is compression coding. Compression coding for digital data on contents allows data originally having large size to be transferred in high speed or to be stored in a small apparatus. In consequence, it has become a common practice to take along a large quantity of data or enjoy music or images in high quality wherever the person is.

There are a variety of methods for compression coding in addition to ones standardized by the international organization for standardization e.g., MPEG (Moving Picture Experts Group) series, including for example, proprietary standards that have been developed by a manufacturer of contents reproducing apparatuses or recorders. Therefore, file formats that can be processed by apparatuses are diversified and complicated depending on models or manufacturers. When the file format for a content and the file format which can be processed by an apparatus for playing the content are different, a user has to convert the file format of the content.

Generally, a file format is converted using a file format converting program which has been processed by a personal computer or the like. This process forces a user to follow a cumbersome procedure, such as, checking the file format for a content and the file format that can be processed by an apparatus which outputs the content, obtaining a proper program for converting the file formats, starting up the program and transferring the data that is generated as a results of inputting the content into the program, to the output apparatus.

Such complexity could be eliminated by using a reproducing apparatus or an output apparatus that support many types of standards for file format. However, the number of chips for codecs to be implemented on the apparatus or the number of codecs to be installed increases. Thus, not only board space for implementing the chips, resources such as a storage area and functions for controlling the chips and the resources will become necessary, but also a license fee to be paid for the codecs will increase. Consequently, the cost for manufacturing the apparatus increases. If a user needs only a limited number of file formats, most of those costs might be wasted in vain.

SUMMARY OF THE INVENTION

In this background, a general purpose of the present invention is to provide a technology for transferring contents smoothly even if the file format of a content to be processed and the file format that can be processed by an apparatus which processes the content are different.

A data transfer system according to at least one embodiment of the present invention is a data transfer system for transferring data to an apparatus connected to the system, and comprises: a first processing unit which executes processing of data transfer to the destination apparatus; and a second processing unit which converts the file format of the data into one of at least one file format which can be processed by the destination apparatus, wherein the first processing unit comprises: a format acquisition unit which acquires the file format of the data from the data and the at least one file format which can be processed from the destination apparatus; and a conversion requesting unit which requests the second processing unit to convert the file format of the data into one of the at least one file format which can be processed when the file format of the data and the at least one file format which can be processed acquired by the format acquisition unit are different.

A recording medium such as a handheld memory may be included in the "an apparatus connected to the system" as well as electronics devices which themselves perform a certain operation, such as, a cellular phone, a handheld audio player, a video reproducing apparatus, an analyzing apparatus or the like. Therefore, in case the connected apparatus is an electronics device the term "file format which can be processed" refers to a file format in which the electronics device can recognize data to operate on. In case the connected apparatus is a recording medium, the term "file format which can be processed" may include a file format which can be stored in the recording medium, a file format in which another electronics device can recognize data to operate on when the recording medium is connected to the electronics device, or the like.

A data transfer apparatus according to at least one embodiment of the present invention is a data transfer apparatus for transferring data to a connected apparatus and comprises: a converter which converts the file format of the data when the file format of the data and at least one file format which can be processed by the destination apparatus are different; and a communication unit which transfers the data, of which the converter converts the file format, to the destination apparatus, wherein the converter comprises a plurality of processors which convert a plurality of units of processing of data at a time in parallel, the plurality of units of processing of data being obtained by dividing the data with a predetermined rule.

A data transfer apparatus according to at least one embodiment of the present invention is a data transfer apparatus for transferring data to a connected apparatus comprises: a format acquisition unit which acquires the file format of the data from the data and at least one file format which can be processed by the destination apparatus from the destination apparatus; a conversion requesting unit which requests a file format converter connected with the data transfer apparatus to convert the file format of the data into one of the at least one file format which can be processed when the file format of the data and the at least one file format which can be processed acquired by the format acquisition unit are different, and a communication unit which acquires the data of which the file format is converted at the file format converter on request from the conversion requesting unit, and transfers the data to the destination apparatus.

A file format converter according to at least one embodiment of the present invention comprises: an input unit which receives the request to convert the file format of data; a converter which: a) converts a plurality of units of processing of data at a time in parallel by a plurality of processors, the plurality of units of processing of data being obtained by dividing the data which is specified by the request for conversion received at the input unit, with a predetermined rule; and b) generates a segment of data sequence by reconstructing the plurality of units of processing of data upon which conversions are completed, sequentially; and an output unit which, every time one segment of the data sequence is generated at the converter, outputs the segment of the data sequence, while not waiting for the completion of the conversion processing for all of the data.

A method for transferring data according to at least one embodiment of the present invention comprises: acquiring the file format of the data from the data to be transferred and at least one file format which can be processed by a destination apparatus from the destination apparatus; reading a program for converting a file format of the data into one of the at least one file format which can be processed into a memory when the file format of the data and the at least one file format which can be processed are different and starting the program; and transferring the data to the destination apparatus while converting the file format of the data into one of the at least one file format which can be processed, by the converting program.

Optional combinations of the aforementioned constituting elements, and implementations of the invention in the form of methods, apparatuses, systems, computer programs and the like may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4 is an exemplary structure of a table which is referred to when the file format supported by a destination apparatus is to be acquired;

DETAILED DESCRIPTION OF THE INVENTION

First Embodiment

Figure 1:
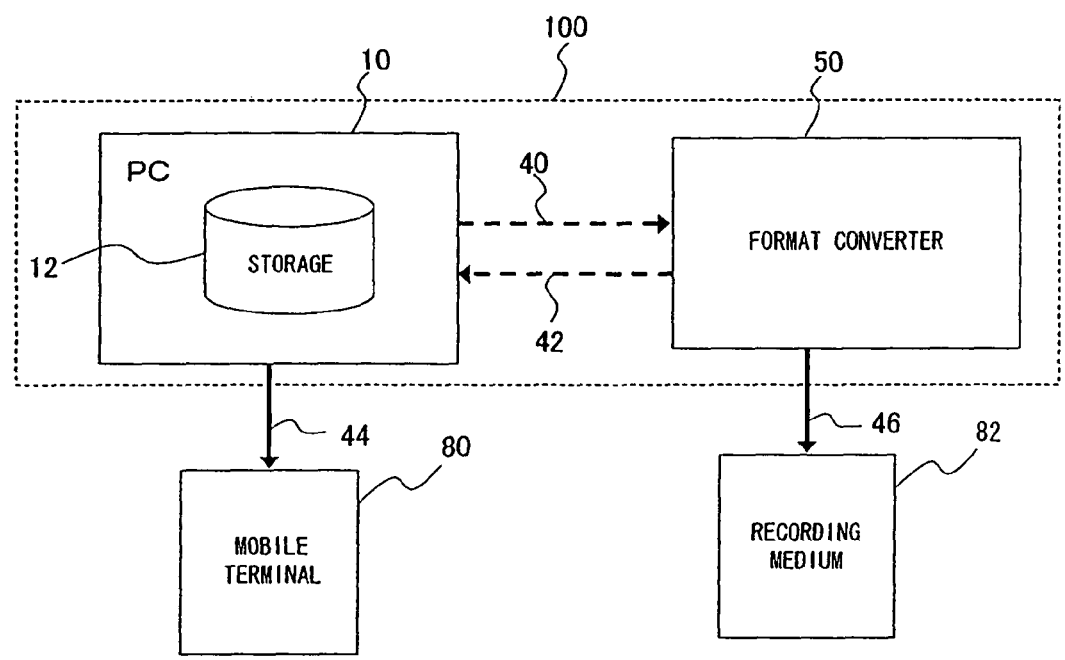
FIG. 1 is a block diagram showing the structure of a data transfer system according to a first embodiment.

Initially, explanation for the entire structure of the present embodiment is given below. FIG. 1 shows the structure of a data transfer system according to the present embodiment. The data transfer system 100 includes a personal computer (hereinafter referred to as a PC) 10 which includes a storage 12 for storing data, and a format converter 50 for converting the file format of data stored in the PC 10.

In FIG. 1, a mobile terminal 80 is connected to the PC 10 and a recording medium 82 to the format converter 50 as examples of destinations of data transfer. Although the mobile terminal 80 typically represents a handheld audio player, cellular phone or the like, it may also represent an output apparatus which can be connected to the PC 10 as well. Thus the mobile terminal 80 can be replaced by an output apparatus, such as, a reproducing apparatus, a recording medium, an analyzing apparatus or a processing apparatus, depending on data to be output and its output mode. Similarly, although the recording medium 82 typically represents, e.g., a handheld memory which is inserted in a consumer appliance or the like to read out data, it may also represent an output apparatus which can be connected to the format converter 50. Thus the recording medium 82 can be replaced by an output apparatus, such as, a mobile terminal, a record reproducing apparatus, an analyzing apparatus, a processing apparatus or the like, as appropriate, depending on needs.

A plurality of output apparatuses may be connected to the PC 10 and/or the format converter 50, respectively. In this case, the mobile terminal 80 or the recording medium 82 shown in the figure may be assumed to be an apparatus selected as the destination of data transfer by a user. Alternatively, only one of the mobile terminal 80 and the recording medium 82 may be connected to the PC 10 or the format converter 50. The PC 10, the format converter 50, the mobile terminal 80 and the recording medium 82 in FIG. 1 transfer and receive data among each other. The transmission mode may be either via wire or wireless.

The PC 10 stores data in the storage 12. Besides that, the PC 10 functions as a user interface which allows a user to input instruction to transfer data. Further, before transferring data to the mobile terminal 80, the PC 10 checks the file format of the data and the file format that can be processed by the mobile terminal 80. If those file formats are different, the PC 10 transfers the data to the format converter 50, and then transfers converted data to the mobile terminal 80. Hereinafter, a file format that can be processed by the apparatus (e.g., the mobile terminal 80) is referred to also as a "supported file format".

Then, an explanation of the entirety of the data flow for the system structured as described above is given. When there is an input instruction to transfer one piece of the data stored in the storage 12 (herein after referred to as data to be transferred) to the mobile terminal 80, the PC 10 acquires and compares the file format of the data and the supported file format of the mobile terminal 80. If the both formats are identical, the PC 10 reads the data to be transferred from the storage 12 and transfers the data directly to the mobile terminal 80 (arrow 44). If the formats are different, the PC 10 requests the format converter 50 to convert the file format and transfers the data to be transferred to the format converter 50 (arrow 40).

The format converter 50 converts the file format of the data to be transferred in accordance with the request from the PC 10 and transfers the converted data to the PC 10 (arrow 42). The PC 10 transfers the converted data to the mobile terminal 80 (arrow 44). In case that stream signals (e.g., audio data, moving image data or the like) are to be converted in the order of arrival at the format converter 50 at a conversion rate comparable to the transfer rate, a flow of a data stream which passes through the arrow 40, the arrow 42 and the arrow 44 is formed. Eventually, the converted data is transferred to the mobile terminal 80.

In case that the destination of data transfer is set to the recording medium 82 which is connected to the format converter 50, the conversion is performed in a similar fashion.

That is, if the file format of data to be transferred and the file format supported by the recording medium 82 are identical, the PC 10 transfers the data directly to the format converter 50 (arrow 40) and the format converter 50 transfers the data to the recording medium 82 (arrow 46). In case the file formats are different, the PC 10 transfers the data to be transferred accompanied by a request to convert the file format to the format converter 50 (arrow 40). The format converter 50 converts the file format and transfers the data to the recording medium 82 (arrow 46). By following the method for processing data stream described above, the flow of a data stream that passes through the arrow 40 and the arrow 46 is formed regardless of whether or not a conversion of the file format is necessary. Eventually the converted data is transferred to the recording medium 82.

According to the structure described above, even when the file format of data to be transferred and the supported file format are different, the data is transferred to the destination apparatus while the file format is being converted automatically. In both cases of transferring the data to the mobile terminal 80 which is connected to the PC 10 and to the recording medium 82 which is connected to the format converter 50, the automatically conversion is achieved by slight changes in the routes from or by the route identical to the route used when the formats match, respectively. Therefore, when transferring data to an apparatus, a user does not have to follow a cumbersome procedure, such as, checking the file formats by himself/herself or inputting the data to be transferred into a conversion program. Moreover, since it seems as if only the transfer process is performed although there are actually some changes in routes, the data to be transferred can be transferred to the apparatus in an appropriate file format without having to care about whether or not a data conversion is performed.

Figure 2:
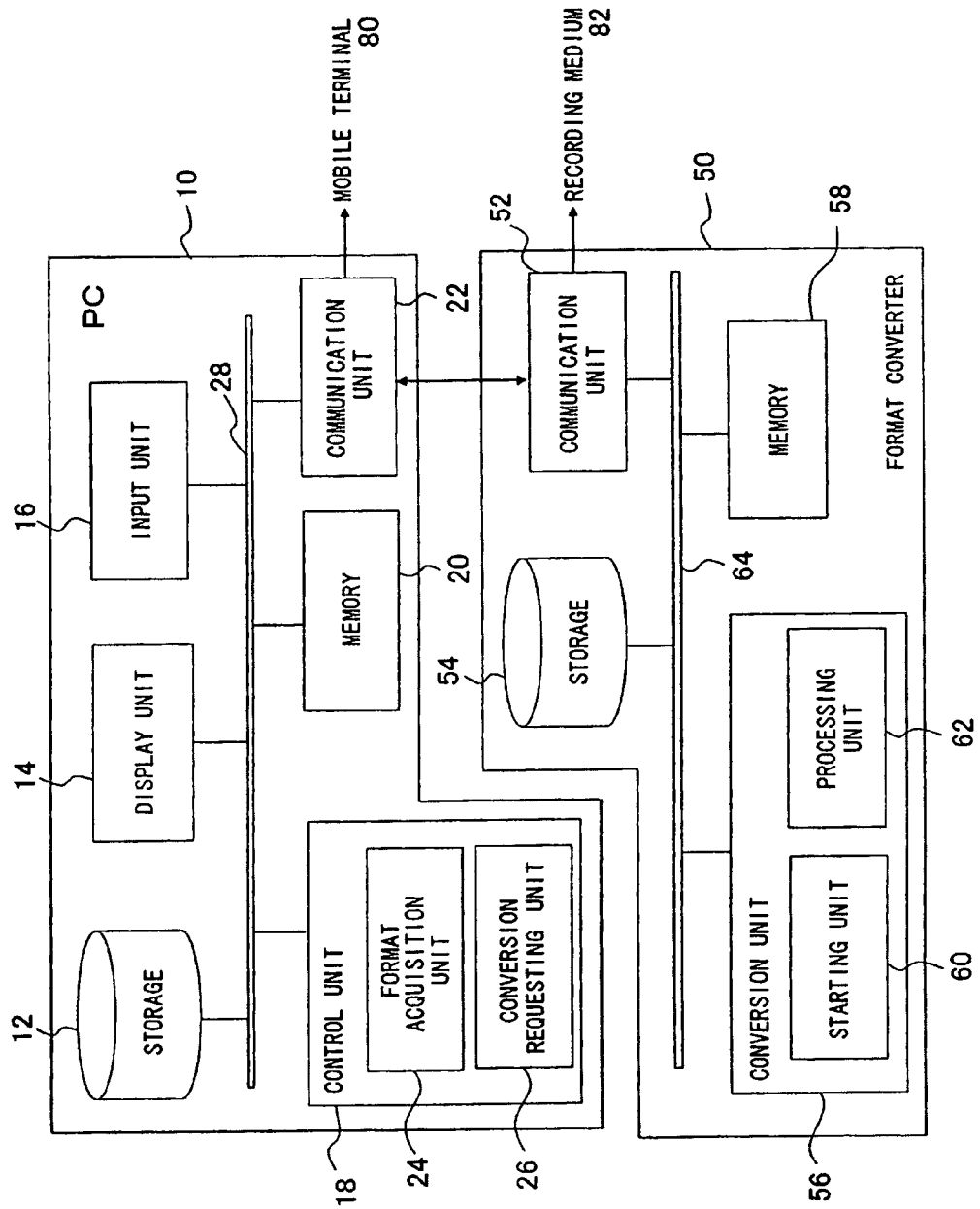
FIG. 2 is a block diagram showing the structure of a PC and a format converter according to the first embodiment in detail.

FIG. 2 shows the structure of the PC 10 and the format converter 50 in detail. Each block shown in, for example FIG. 2, as a functional block which executes a variety of processes may be implemented hardwarewise by elements such as a CPU, a memory or other LSIs, and softwarewise by a computer program for transferring data, or the like. Therefore, it will be obvious to those skilled in the art that the functional blocks may be implemented in a variety of manners by a combination of hardware and software. Thus the present invention is not limited to any of these.

The PC 10 includes a display unit 14, an input unit 16, a control unit 18, a memory 20 and a communication unit 22 besides the storage 12 which stores data. The display unit 14 displays an input screen for inputting an instruction to transfer data. To the input unit 16, a user inputs an instruction to transfer data. The control unit 18 performs main functions for controlling data, including, checking file formats, requesting a conversion, or the like. The memory 20 stores information on file formats or the like. The communication unit 22 transfers and receives data and/or request signals to and from the format converter 50 or the mobile terminal 80. The element blocks described above are connected to a bus 28 and transfer and receive signals among each other.

The control unit 18 includes a format acquisition unit 24 and a conversion requesting unit 26. The format acquisition unit 24 acquires the file format of the data to be transferred and the supported file format of an apparatus which is selected by a user as the destination for transfer (herein after referred to as a destination apparatus), such as the mobile terminal 80 or the recording medium 82, and performs comparison. The conversion requesting unit 26 requests to the format converter 50 for processing format conversion when a file format conversion is needed.

The format acquisition unit 24 can recognize the file format of the data to be transferred by, for example, reading the extension of the data. The format acquisition unit 24 can also acquire identification information of the destination apparatus by utilizing a device recognition function supplied by a typical operating system. Then the format acquisition unit 24 can recognize the supported file format of the destination apparatus by referring to a table stored in the memory 20. The table associates identification information of a destination apparatus with the file format supported by the apparatus.

The conversion requesting unit 26 requests a conversion by, for example, transferring the data to be transferred, to which the file format of the data to be transferred and the supported file format of the destination apparatus are attached as a header, to the format converter 50. Alternatively, the conversion requesting unit 26 may transfer the information on the file formats, the name or the address of the data to be transferred or the like, as a request signal in advance. Then, on receiving the information, the format converter 50 may read the data to be transferred from the storage 12 and perform a format conversion. The method for recognizing a file format or the method for requesting a conversion of a file format described above is given by way of an example. Thus, other generally used methods or the combination of the methods may be adopted. For example, to transfer data to be transferred, a function block such as, a memory controller or a direct memory access controller (not shown) may be used. The method will not be described here further as it is well known in the art.

The format converter 50 includes a communication unit 52 and a conversion unit 56. The communication unit 52: a) transfers and receives data to and from the PC 10 and; b) receives request signals for a format conversion from the PC 10. The conversion unit 56 executes format conversion processing. The format converter 50 further includes a storage 54 which stores a conversion program that is a combination of codecs of different file formats. A conversion program for a file format which will be used frequently may be stored in the storage in advance. Alternatively, a program may be installed by a user as appropriate, when necessary. The above described element blocks are connected to a bus 64 and transfer and receive signals among each other.

A convertible file format can be added as usual by installing a program. This configuration allows developments of converters that meet needs of diverse users, for example, a user who handles a variety of types of data or a user who handles generally a limited types of file formats. Consequently, it makes possible to prevent license fees or resources for use from being wasted, as well as to meet the changing needs of users with flexibility.

The conversion unit 56 includes a starting unit 60 and a processing unit 62. The starting unit 60 loads a conversion program from the storage 54, the program being selected based on the file formats before and after the conversion included in a request signal transferred from the PC 10. The processing unit 62 executes the loaded program. The format converter 50 further includes a memory 58 which stores machine code of the loaded program and/or data necessary for the processing.

The PC 10 and the format converter 50 communicate with each other via the communication unit 22 and the communication unit 52, provided in the PC 10 and in the format converter 50, respectively. The communication may be performed either via a cable, or wirelessly. In one exemplary structure according to the present embodiment, a centralized processing apparatus has also a function as the format converter 50. The centralized processing apparatus is always connected to or wirelessly connected to the PC 10 and/or other apparatuses and by utilizing the communication, performs process for improving the function of respective apparatuses, intensively and in high-speed. With this configuration, it is not even necessary to connect the format converter 50 with the PC 10 for data conversion. Thus the user can transfer the data to be transferred to the destination apparatus in an appropriate file format without knowing about the format conversion at all.

Although the aforementioned configuration is a desirable one, the configuration does not limit the scope of the present embodiment. That is, even with the configuration wherein the format converter 50 is to be connected with the PC 10 when transferring data, determination of the necessity of file format conversion and the conversion processing can be performed automatically. Thus user can transfer the data to be transferred in an appropriate file format to the destination apparatus while knowing little about file formats.

Figure 3:
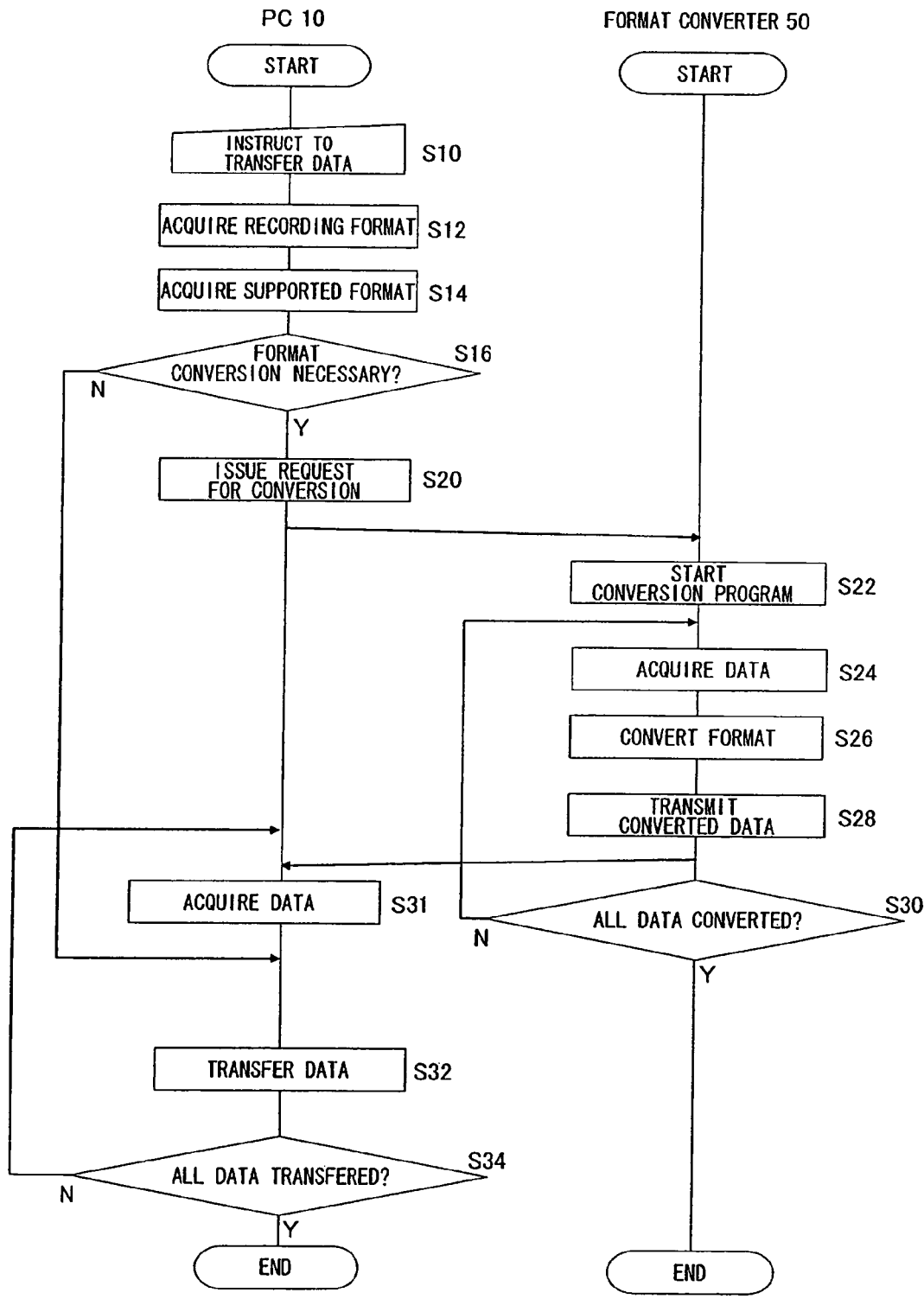
FIG. 3 is a flow chart showing processing procedures performed by the PC and the format converter according to the first embodiment.

The explanation on the operation of the data transfer system implemented according to the configurations described above is given below. FIG. 3 shows a processing procedure performed by the PC 10 and the format converter 50 to transfer the data to be transferred. Initially, by making the display unit 14 of the PC 10 display the input screen for accepting instructions to transfer data, and by selecting and inputting data to be transferred and a destination apparatus into the input unit 16, a user instructs to transfer the data (S10).

When instructing the PC to transfer data, a method which is generally used for data moving and copying (e.g., dragging and dropping the icon of the data to be transferred displayed on the display unit 14 to the icon of the destination apparatus by using the input unit 16 as a pointing device) may be used. By not displaying information on data formats hereinafter, a user is allowed to achieve conversion processing without knowing about data formats from beginning to end.

As the PC 10 recognizes the input of the instruction, the format acquisition unit 24 acquires the file format of the data to be transferred and the supported file format of the destination apparatus in a aforementioned method (S12, S14), and by comparing the both formats, determines whether or not a file conversion is necessary (S16). If it is determined that the file conversion is unnecessary (N in S16), under the control of the communication unit 22 in the PC 10, the data to be transferred is transferred from the storage 12 to a destination apparatus, for example, the mobile terminal 80 (S32). In case the destination apparatus is the recording medium 82 connected to the format converter 50, the two communication unit, communication unit 22 in the PC 10 and the communication unit 52 in the format converter, may operate in cooperation with each other, for example, the communication unit 22 control data transmission to the format converter 50 and the communication unit 52 may control data transmission to the recording medium 82.

If it is determined that the data conversion is necessary (Y in S16), the conversion requesting unit 26 issues a request signal for requesting a file format conversion to the format converter 50 (S20). The request signal includes the file format of the data to be transferred and the supported file format of the destination apparatus. In the format converter 50, the starting unit 60 in the conversion unit 56 loads a conversion program as appropriate (S22) based on the file formats before and after the conversion that are included in the request signal for conversion. Meanwhile, the communication unit 52 in the format converter 50 acquires the data to be transferred (S24) by acquiring the data to be transferred included in the request signal or by reading the data from the storage 12 in the PC 10 based on the name or the address of the data to be transferred included in the request signal. In this process, the data to be transferred may be stored in the memory 58 temporarily.

Then, the processing unit 62 in the conversion unit 56 converts the file format of the data to be transferred (S26). In case the data to be transferred is time-series data which changes on the time axis (herein after referred to as a code sequence), when a segment of the code sequence (herein after referred to as a code sequence segment) is acquired in S24, the processing unit 62 in the conversion unit 56 converts the file format of the code sequence segment sequentially. It is desirable that conversion processing be performed at high-speed, so that the transfer rate does not seriously slow down due to the conversion of a file format. An example of the method of conversion processing will be described in detail below.

Data (e.g., a code sequence) converted by the processing unit 62 is transmitted, under the control of the communication unit 52, to the PC 10 (S28). The data is acquired by the PC 10 (S31) and is transferred, under the control of the communication unit 22 in the PC 10, to the mobile terminal 80 (S32). In case that code sequence segments are transmitted in the S28, each code sequence segment may be transferred to the terminal sequentially in the transmitted order. In this process, the format converter 50 repeats a series of processing: acquiring data in S24; converting the file format in S26; and transmitting the converted data in S28, for each predetermined unit of data (e.g., a code sequence segment as a unit), sequentially (N in S30). When all the data to be transferred is converted and transmitted, the process in the format converter 50 ends (Y in S30). Meanwhile, the PC 10 repeats the processes of acquiring data in S31 and transferring data in S32 (N in S34). When the transferring of all the data is completed, the process in the PC 10 ends (Y in S34).

In case the processing is performed sequentially for each code sequence segment as a unit of processing, a) a processing loop from S24 to S30 in the format converter 50, which includes acquisition of data, conversion of a format and transmission of the data; and b) a processing loop from S31 to S34 in the PC 10, which includes acquisition of the data and transfer of the data, are performed concurrently. As a result, the code sequence passes along through PC 10→format converter 50→PC 10→mobile terminal 80, while being performed format conversion.

FIG. 4 shows an exemplary structure of a table stored in the memory 20 in the PC 10. The format acquisition unit 24 refers to the table when acquiring the supported file format of the destination apparatus in S14. The supported file format table 400 includes a field for the names of articles 402 where the names of destination apparatuses are to be written, a field for model numbers 404 where the model numbers of the apparatuses are to be written and a field for file formats 406 where the supported file formats of respective apparatuses are to be written. The "names of articles" and the "model numbers" may be replaced by another attribute information as far as an apparatus can be identified with the information.

A supported file format table 400 that includes information on representative apparatuses may be generated and may be stored in the memory 20 in advance. Alternatively, a supported file format table 400 may be revised, only when a destination apparatus is connected to the PC 10 or the like for the first time, by inputting information on the supported file format manually or automatically. The format acquisition unit 24 searches the supported file format table 400 for the supported file format of the destination apparatus, based on the name or the model number included in identification information acquired by a general method for recognizing apparatuses.

Some destination apparatuses correspond to a plurality of file formats as shown in FIG. 4. In this case, the file format of data to be transferred and all the supported file formats written in the field for file formats 406 of the destination apparatus are compared in S16 of FIG. 3 and if there is the identical file format, the transfer processing is performed in S32. If there are no identical file formats, the conversion requesting unit 26 includes all the file formats written in the field for file formats 406 into a request signal for converting a file format issued in S20. The starting unit 60 in the format converter 50 starts a conversion program which can convert the input file format into any one of those file formats. If there are a plurality of file formats into which the input file format can be converted, one of conversion programs is started up by setting a certain rule: For example, the file format firstly included in the request signal is given priority.

Subsequently, a method for performing a high-speed processing of a file format conversion by the processing unit 62 in the conversion unit 56, when data to be transferred is a code sequence, will be explained below. The conversion processing is performed, for example, by decompressing data based on the original file format and by compressing the data into the supported file format of destination apparatus. Therefore, in the processing unit 62, decoding processing by a certain codec and encoding processing by another codec are performed in combination. According to the present embodiment, high speed processing is implemented by dividing a code sequence into predetermined units of processing and by performing format conversions in parallel.

Figure 5:
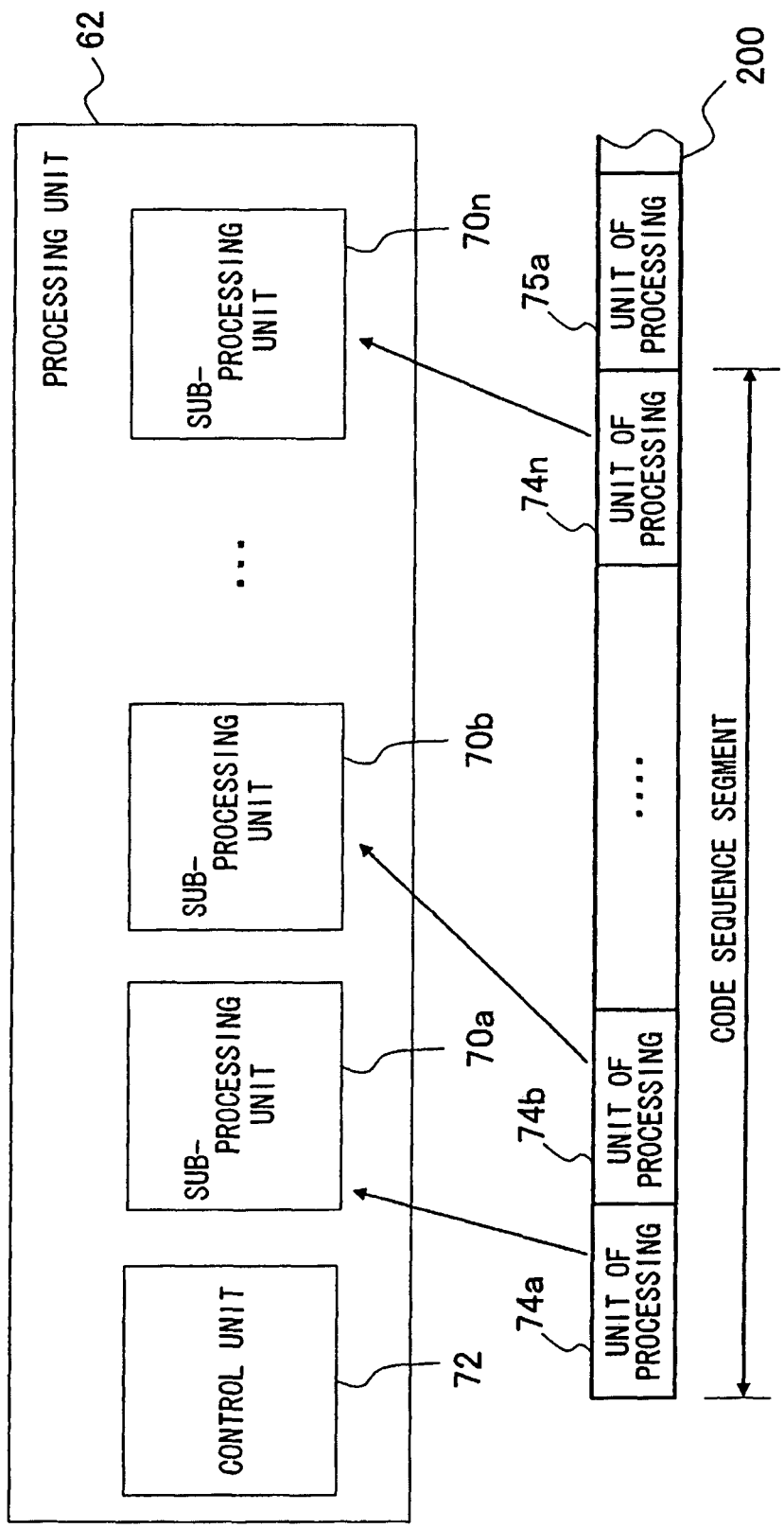
FIG. 5 is a diagram for explaining the structure of a processing unit according to the first embodiment.

FIG. 5 shows the structure of the processing unit 62 in this process. The processing unit 62 includes, a plurality of sub-processing units 70a, 70b, ... 70n and a control unit 72. The control unit 72 divides a code sequence 200 into units of processing having a predetermined size and allocates each unit of processing to each of a plurality of sub-processing units 70a, 70b, ... 70n. A plurality of sub-processing units 70a, 70b, ... 70n perform conversion processing in parallel.

Further, the control unit 72 reconstructs, in chronological order, a plurality of units of processing of data on which conversion processing has been performed in parallel at a time, and generates a code sequence segment. Meanwhile, one of a plurality of sub-processing units 70a, 70b, ... 70n may function as the control unit 72.

The code sequence 200 is divided into a plurality of units of processing of data 74a-74n, 75a, etc by the control unit 72 as shown in FIG. 5. Initially, the same number of units of processing of data 74a, 74b, ..., 74n as the number of sub-processing units 70a, 70b, ... 70n are allocated to each of sub-processing units 70a, 70b, ... 70n respectively and processed virtually simultaneously. Thus, n units of processing of data are converted at a time.

Figure 6:
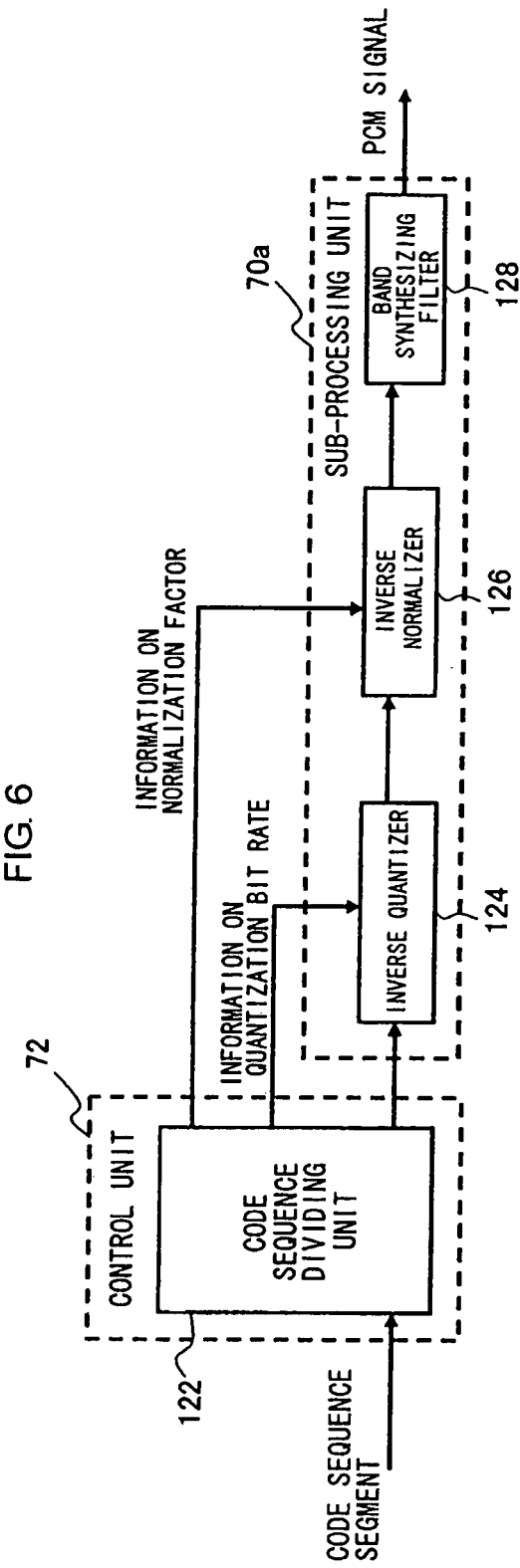
FIG. 6 shows an exemplary structure of the processing unit when the unit performs a decoding process upon a code sequence encoded by a certain codec.
Figure 7:
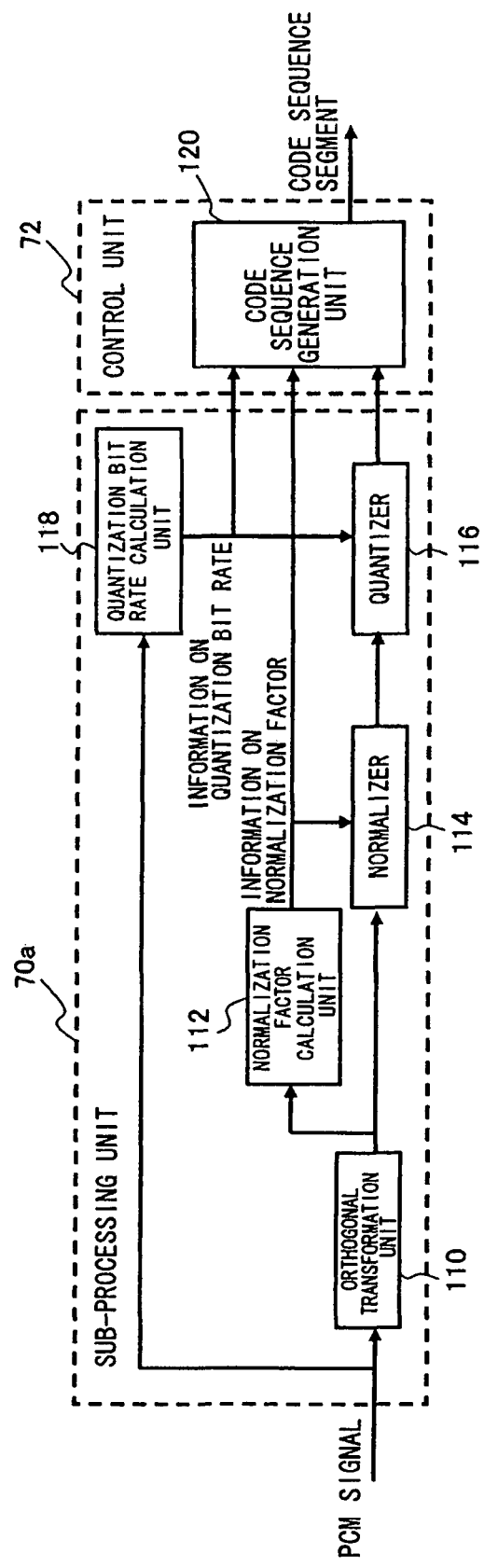
FIG. 7 shows an exemplary structure of the processing unit when the unit performs an encoding process using another codec than that of FIG. 6.

FIGS. 6 and 7 show an exemplary structure of the processing unit 62 when performing decoding processing of a code sequence encoded by a certain codec, and when performing encoding processing using another codec as a file format conversion process, respectively. In practice, the processing performed by each function block shown in FIG. 6 and FIG. 7 is performed consecutively. In the processing unit 62 shown in FIG. 6, the control unit 72 includes a code sequence dividing unit 122. The sub-processing unit 70a includes a inverse quantizer 124, a inverse normalizer 126 and a band synthesizing filter 128. Although other sub-processing units 70b-70n also include a similar structure and perform similar processing, an explanation is given with an example of the sub-processing unit 70a. With a codec which is assumed in FIG. 6, bandwidth splitting is operated on a PCM (Pulse-Code Modulation) signal and normalization and re-quantization are performed on the time-series samples which are thinned out depending on bandwidth, for each sub-band. However, the method is described by way of an example only.

Initially, the code sequence dividing unit 122 in the control unit 72 divides the input code sequence segment into n units of processing. For one unit of processing among the n units of processing of divided code sequence segment, inverse quantizing processing is performed at the inverse quantizer 124 and inverse normalizing processing is performed at the inverse normalizer 126, in the sub-processing unit 70a. Information on a quantization bit rate and information on a normalization factor included in the input code sequence segment is acquired by the inverse quantizer 124 and the inverse normalizer 126. Based on the information, the inverse quantization processing and inverse normalization processing are performed. Data for respective sub-bands are synthesized by the band synthesizing filter 128 and the original PCM signal is generated. However, the signal acquired through this process corresponds to a unit of processing of data on which the sub-processing unit 70a performs processing.

In the processing unit 62 shown in FIG. 7, the sub-processing unit 70a includes an orthogonal transformation unit 110, a normalization factor calculation unit 112, a normalizer 114, a quantization bit rate calculation unit 118 and a quantizer 116. While other sub-processing units 70b-70n include a similar structure and perform similar processing, as an example, an explanation is given of the sub-processing unit 70a here. The control unit 72 includes a code sequence generation unit 120. With the codec which is assumed in FIG. 7, a spectrum signal is acquired by performing an orthogonal transformation on a PCM signal. Then, the spectrum signal is split into sub-bands having predetermined bandwidth and then normalization and re-quantization are performed. However, the described method is given by way of an example only.

A unit of processing of PCM signal which is decoded by the structure shown in FIG. 6 is orthogonal-transformed at the orthogonal transformation unit 110 and normalized for each sub-band at the normalizer 114. The normalization is performed based on the information on the normalization factors computed by the normalization factor calculation unit 112. The normalized data is quantized at the quantizer 116, based on the information on the quantization bit rates computed at the quantization bit rate calculation unit 118. N units of processing of data acquired in this way at respective sub-processing units 70a, 70b, 70n are reconstructed in time series at the code sequence generation unit 120 in the control unit 72 and a code sequence segment is generated.

By starting a program for decoding process and a program for encoding process for respective codecs based on the file format of data to be transferred and the supported file format of a destination apparatus, the processing unit 62 functions in a similar fashion to that shown in FIG. 6 and FIG. 7, and a file format is converted in high-speed. Function blocks contained in the processing unit 62 vary depending on codecs. Besides the structures shown in FIG. 6 and FIG. 7, a structure which is used generally may be adopted. For example, by replacing the band synthesizing filter 128 in FIG. 6 with a block which performs inverse orthogonal transformation and by replacing the orthogonal transformation unit 110 in FIG. 7 with a band dividing filter, file format conversions which is inverse to the aforementioned one can be performed.

In the method for converting a code sequence described above, a code sequence is decoded into PCM data temporarily, and then the PCM data is encoded. However, the method is described by way of an example. Another method may also be adopted, for example, in case that both file formats before and after the conversion are based on encoding formats for spectrum data, the encoding may be performed when a code sequence is decoded into spectrum data, without decoding into PCM data.

As an example of the code sequence 200, it will be assumed that an audio stream is divided into units of processing having equal length of 128 blocks. Since the reproduction time for one block of audio stream is 10 msec, the reproduction time for one unit of processing which consists of 128 blocks of data, is about 1 sec. Therefore, data included in one code sequence segment represents data for n seconds. By allowing respective sub-processing units 70a, 70b, . . . and 70n to convert one code sequence segment in parallel, the conversion processing is completed with the speed which is n times faster compared with the case that the conversion processing is performed from the head of the code sequence 200 sequentially without parallel processing.

Although the method is explained in the foregoing only in relation to a audio stream, a code sequence may be divided into proper units depending on the type of data, type of coding or the like. For example, in case a code sequence 200 is video data, the code sequence may be divided in the units of GOP. The method is especially appropriate for performing conversion processing on data having strong chronological independence, such as a audio stream. With this kind of data, since the dependency among each unit of processing of data is small, the conversion is performed without structuring a new scheme for division or reconstruction. That is, when outputting units of processing of data on which conversions have been performed in parallel, the mere outputting of the data in proper sequence forms a code sequence segment, and eventually, a code sequence of which the file format is converted. The proper sequence for units of processing of data is comprehended by managing units of processing of data, using identification information which is given when dividing a code sequence segment.

A description of a desirable speed of conversion processing to implement the present embodiment effectively is given below. The transfer speed of an existing typical interface is several tens to several hundreds Mbps. Meanwhile, compression performance of audio data is typically about a hundred kbps. Therefore, by converting audio data at a thousand times the speed of real time decoding, the conversion speed becomes comparable to transfer speed, which allows a series of processing (i.e., transfer, conversion and transfer) to be performed in an assembly-line like manner. With a method in which a plurality of sub-processing units 70a, 70b, . . . and 70n perform conversion processing in parallel as shown in FIG. 5, the speed of conversion processing increases as the number of sub-processing units increases. Further more, by configuring the sub-processing units 70a, 70b, . . . and 70n with processors capable of computing in high-speed, the speed of conversion processing will be increased significantly.

Although the above described speed of conversion processing is a desirable spec to perform file format conversion without users' realizing the conversion processing, the spec will not limit the scope of the present embodiment. Meanwhile, encoder chips or the like having a hundred times the speed of real time encoding have been also developed. Thus assuming that the chip is combined with the parallel conversion processing described above, the spec is sufficiently feasible. Naturally, with the parallel processing of FIG. 5 alone, the speed of conversion processing increases, and thus the advantage of the present embodiment, the reduction of users' burden in respect to file formats, can be more significant.

According to the present embodiment described above, when transferring data stored in a PC or the like to an external apparatus, the file format of the data and the file format supported by the external apparatus are acquired, determination is made as to the necessity of a conversion of the file format and if necessary, the request for a conversion is issued to the format converter. At the format converter, the conversion is performed in high-speed, for example, conversions are performed in parallel. Through this process, the data is converted into an appropriate file format automatically and transferred to the external apparatus, while it seems as though the data is just transferred to the apparatus. As a result, a user does not have to care about cumbersome chores in respect to file formats, which saves the time and trouble. Further, since the conversion is performed automatically only with an indication, such as, "the data is moved to the external apparatus", a user who is unfamiliar with electronic devices can convert a file format and can transfer data easily, which allows the user to take along the data or appreciate the contents of the data, casually.

According to the present embodiment, the conversion processing is performed by a program installed in the format converter. Therefore, only a function for converting a file format necessary for an individual user, among a variety of existing file formats, can be installed. Further, number of conversion types can be increased or decreased easily, according to the circumstances. In consequence, not only a waste of the license fee or the resources such as storage area can be eliminated, but also changes in status can be dealt with flexibility.

Moreover, according to the present embodiment, the conversion processing is performed in the middle of a transfer route from a storage in which the data is stored to an external apparatus. Thus, the data is never transferred simultaneously to other storage areas than that of the external apparatus which is the desired destination. Since a typical format conversion by software is performed inside a PC, converted data is once stored in the storage area of the PC. Then, the converted data is transferred to a desired external apparatus by user's action, such as, copying of the data. In comparison to that, according to the present embodiment, the data is transferred directly to the desired external apparatus on one instruction, without leaving unnecessary data inside the PC. Therefore, an adverse effect (e.g., shortage of storage area in the PC) can be avoided.

According to the present embodiment, the format conversion processing is performed in high-speed and with ease. Therefore, it is not necessary to leave the converted data inside the PC to provide for the re-use of the data, as conversions can be performed instantly when needed. Thus, for example, only the high-quality master data may be stored in the PC and a conversion may be performed every time the data needs to be transferred to an external apparatus, without unduly burdening a user. Also, the data management in the PC may be simplified.

Second Embodiment

The present embodiment has a structure in which the data transfer system of the first embodiment is connected to a server via a network. Basic functions and operations are similar to those explained in reference to FIG. 1 of the first embodiment. Thus, explanation is given mainly on points different from the first embodiment hereinafter. The same reference numeral is attached on a function block which operates in a similar fashion with that of the first embodiment and an explanation for the block is omitted.

Figure 8:
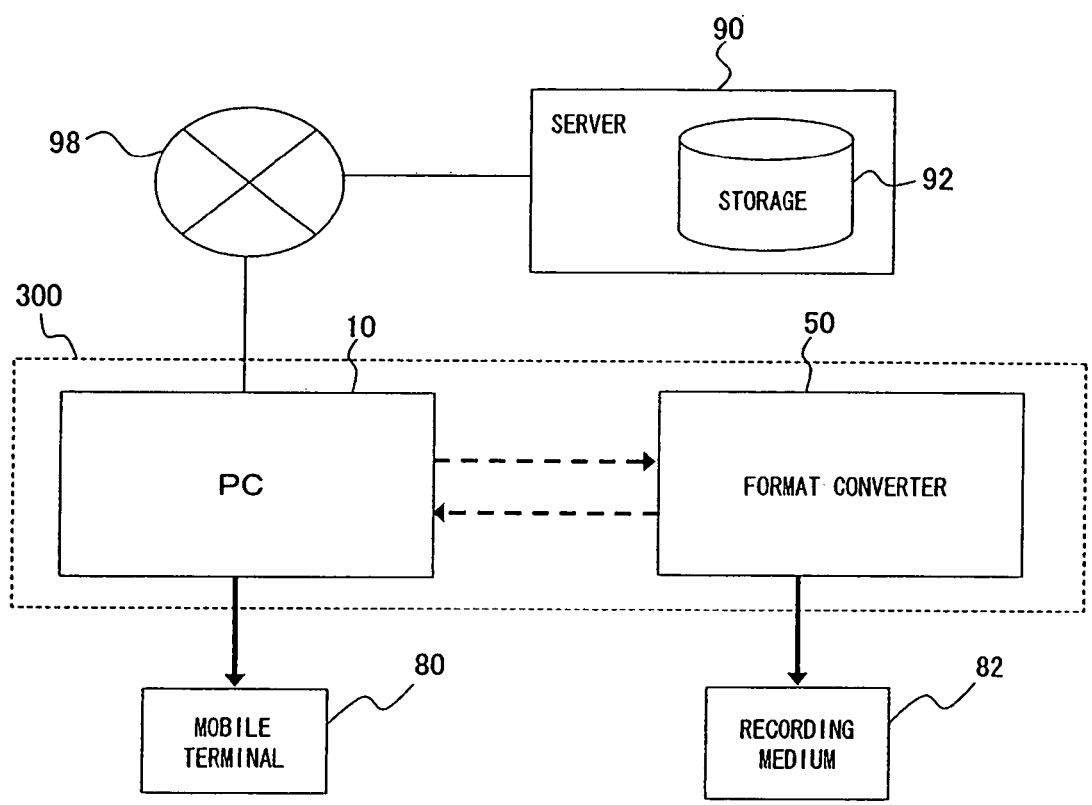
FIG. 8 is a block diagram showing the structure of a data transfer system according to the second embodiment.

FIG. 8 shows the structure of a data transfer system according to the present embodiment. The data transfer system 300 is implemented in a similar fashion as the data transfer system 100 of the first embodiment in the respect that it includes a PC 10, a format converter 50 and is connected to a mobile terminal 80 and a recording medium 82. Therefore, the PC 10 and the format converter 50 may be configured in a similar fashion as shown in FIG. 2. On the other hand, the data transfer system 300 is different from the data transfer system 100 in respect that it includes a server 90 which is connected with the system through the network 98.

The server 90 includes a storage 92, which stores a wide variety of tools that can be used for file format conversion processing in the format converter 50. The term "variety of tools" refers to: a codec for each file format, a conversion program comprising a combination of those codecs, a table for supported file formats, or the like.

In the first embodiment, these tools are stored in the storage 54 in the format converter 50 or the memory 20 in the PC 10. According to the present embodiment, these tools are acquired from the server 90 via a network. The tools can be acquired from the server 90 at the point when the programs or information stored in the storage 54 or the memory 20 turn out to be insufficient when performing process.

For example, when the format acquisition unit 24 acquires the supported file format of a destination apparatus, based on the identification information on the apparatus, the format acquisition unit 24 initially tries to acquire the supported file format by referring to the supported file format table 400 in the memory 20. In case the identification information of the apparatus is not included in the supported file format table 400, the format acquisition unit 24 accesses the server 90. Then, the format acquisition unit 24 searches a supported file format table stored in the storage 92 for the identification information on the apparatus and acquires the supported file format. For example, in case the destination apparatus is a new model and its identification information has been added to an entry only recently, the latest information is acquired by accessing the server 90.

Similarly, in case the starting unit 60 in the format converter 50 starts up a program for converting a file format, the starting unit 60 searches for the conversion program installed in the storage 54 in the format converter 50, based on the file formats of before and after the conversion that are included in a conversion request signal from the PC 10. However, in case a necessary program has not been installed in the storage 54 (e.g., when a new apparatus is purchased, when data to be transferred is in a new file format or the like), the starting unit 60 downloads the program from the server 90 via the PC 10 and the network 98. Prior to downloading, a message screen may be displayed on the display unit 14 of the PC 10, which allows a user to determine whether or not to download the program.

In the above description, the format acquisition unit 24 or the starting unit 60 searches the storage 92 in the server 90. However, the server 90 may play a central role in the processing. In this case, the format acquisition unit 24 or the starting unit 60 may only make an inquiry to the server 90. That is, the server 90 itself may have a serving function for: a) searching for information on file formats or programs; and b) providing the information or programs to an apparatus which has accessed the server 90.

According to the present embodiment described above, information on the file format supported by a destination apparatus and/or a necessary program for conversion are acquired from a server via a network. This makes it possible to implement a data transfer system which supports the latest models. Also, because a program for file format conversion is easily obtained, the number of default bundled programs to be installed can be minimized. Therefore, a waste of license fees or resources can be eliminated, while having flexibility in its structure. Further, the data can be transferred in a proper file format to a destination apparatus without following troublesome procedures, as described in the first embodiment.

Given above is an explanation based on the exemplary embodiments. These embodiments are intended to be illustrative only and it will be obvious to those skilled in the art that various modifications to constituting elements and processes could be developed and that such modifications are also within the scope of the present invention.

For example, according to the present embodiment, the speed of the conversion processing of a file format is increased by dividing data to be transferred into units of processing having a predetermined size and by performing parallel processing. Nevertheless, each unit of processing may not have the same size. For example, in case that data on a music album is to be transferred, data for each song may be allocated to each sub-processing unit when performing parallel conversion. In this manner, data may be divided into segments of any size from microscopic size to macroscopic size. A rule to be followed when dividing data may be determined appropriately based on the type of data, in consideration of: a) the processability when dividing data or reconstructing after conversion, b) the timing of the completion of conversion processing for each unit of processing, c) or the like. In this case as well, the conversion processing is performed in high-speed, thus an advantages similar to that obtained in the first embodiment can be achieved.

By utilizing the system structure of the second embodiment in FIG. 8, the data to be transferred itself may be acquired from the storage 92 in the server 90. That is, the PC 10 receives an instruction for transferring the data from the server 90 to the mobile terminal 80 or the like, then, the PC 10 acquires the file format of the data in the server 90 and the supported file format of the mobile terminal 80. If the file format conversion is necessary, the PC 10 transfers the data acquired from the server 90 directly to the format converter 50 and requests conversion processing. The rest of the processing is performed in a similar fashion as described in the first embodiment.

Through this process, the data downloaded from the server 90 can be transferred directly to the mobile terminal 80 in a proper file format. Thus, the PC 10 does not have to store not only the converted data but also the original data. As a result, data selected from a large volume of data provided via a network can be transferred to a connected apparatus easily, while preventing unnecessary data from being stored in the PC 10.

What is claimed is:

1. A data transfer system for transferring a data stream to an apparatus connected to the system, comprising:
   a first processing apparatus, which executes processing of a data stream transfer to the destination apparatus according to a user's direct operation; and
   a second processing apparatus, which converts the file format of the data stream sequentially in the order of stream into a designated file format,
   wherein the first processing apparatus comprises:
   an input unit which receives a data transfer request input by a user with designating the destination apparatus;
   a format acquisition unit, which acquires a first file format of the data stream from the data stream and a second file format that can be processed by the designated destination apparatus from the destination apparatus; and a conversion requesting unit, which executes data stream transfer via a network, to the second processing apparatus with requesting conversion of the first file format of the data stream into the second file format so that the file format is converted on the data stream transferring path in the network to the destination apparatus, when the first file format is different from the second file format acquired by the format acquisition unit, and the second processing apparatus comprises:

a conversion unit which converts the data stream transferred by the first processing apparatus in the order of data arrival with receiving the data stream; and a communication unit which sequentially outputs the data stream converted by the conversion unit in the order of data conversion, wherein the communication unit, every time one segment of the data stream is generated at the conversion unit, outputs the converted segment to the data stream transferring path in the network while not waiting for the completion of the conversion processing of all of the data stream.

2. The data transfer system according to claim 1, wherein:

the first processing apparatus further comprises a memory, which stores a supported format table associating identification information retained in the destination apparatus, which can be connected to the first processing apparatus, with a file format that can be processed by the destination apparatus; and wherein the format acquisition unit acquires the second file format that can be processed in reference to the supported format table, based on identification information that is read out from the destination apparatus.

3. The data transfer system according to claim 1, wherein the first processing apparatus acquires the data stream from a server connected to the system via a network and transfers the data stream acquired from the server and the data stream after format conversion acquired from the second processing apparatus to the destination apparatus, without storing either of the data into a memory to reuse.

4. The data transfer system according to claim 1, wherein the first processing apparatus acquires a converted part of the data stream from beginning of the stream, on which file format conversion is requested, from the second processing apparatus sequentially via the network, and transmits the acquired part of the data stream to the destination apparatus sequentially.

5. A data transfer apparatus for relaying data stream transfer, via a network, from a data source apparatus to a destination apparatus designated by the data source apparatus, comprising:

a converter, which converts a file format of the data stream in the order of data arrival from the data source apparatus so that the file format is converted on the data stream transferring path in the network to the destination apparatus, when the file format of the data stream is different from a file format that can be processed by the destination apparatus; and a communication unit, which sequentially outputs the data stream, of which the converter converts the file format, in the order of data conversion, wherein the communication unit, every time one segment of the data stream is generated at the converter, outputs the converted segment to the data stream transferring path to the destination apparatus while not waiting for the completion of the conversion processing of all of the data stream, wherein the converter comprises a plurality of processors that convert a plurality of units of processing of the data stream at a time in parallel, the plurality of units of processing of the data stream being obtained by dividing the time series of the data stream in the order of streaming.

6. The data transfer apparatus according to claim 5, wherein the converter generates a segment of data sequence by sequentially reconstructing the plurality of units of processing of data stream converted at a time in parallel, and the communication unit, every time one segment of the data sequence is generated at the converter, transfers the segment of the data sequence to the destination apparatus.

7. A data transfer apparatus for transferring data according to a user's direct operation, comprising:

an input unit which receives a data transfer request input by a user with designating a destination apparatus;

a format acquisition unit, which acquires a first file format of the data stream from the data stream and a second file format that can be processed by the designated destination apparatus from the destination apparatus;

a conversion requesting unit, which executes data stream transfer via a network, to the file format converter with requesting conversion of the first file format of the data stream into the second file format so that the file format is converted on the data stream transferring path in the network to the destination apparatus, when the first file format is different from the second file format acquired by the format acquisition unit, and a communication unit, which relays the data stream of which the file format is converted at the file format converter on request from the conversion requesting unit, by transferring the data stream to the destination apparatus, wherein the communication unit acquires the data stream segment by segment, the segment being obtained by dividing the time series of the data stream in the order of streaming and being converted at a time by the file format converter, wherein the communication unit, every time one segment of the data stream is generated at the file format converter, outputs the converted segment to the data stream transferring path and transfers the converted segment to the destination apparatus, while not waiting for the completion of the conversion processing of all of the data stream.

8. A method for allowing a computer to execute data stream transfer, comprising:

receiving a data transfer request input by a user with designating the destination apparatus;

acquiring a first file format of the data from the data stream to be transferred and a second file format that can be processed by the designated destination apparatus from the destination apparatus;

executing data stream transfer via a network to a file format converter with requesting conversion of the first file format of the data stream into the second file format so that the file format is converted on the data stream transferring path in the network to the destination apparatus, when the first file format of the data stream is different from the second file format; converting, by the file format converter, the transferred data stream in the order of data arrival with receiving the data stream; and proceeding the data stream transfer by transferring the converted data in the order of data conversion every time one segment of the data stream is generated at the file format converter, outputting the converted segment to the to the data stream transferring path in the network to the destination apparatus while not waiting for the completion of the conversion processing of all of the data stream;

wherein the converting the file format converts a plurality of units of processing of data stream at a time in parallel by a plurality of processors, the plurality of units of processing of data stream being obtained by dividing the time series of the data stream in the order of streaming.

9. A computer program product allowing a computer to execute data stream transfer to an external apparatus, comprising:
 a module that receives a data transfer request input by a user with designating a destination apparatus;
 a module that acquires a first file format of the data stream from the data stream and a second file format that can be processed by the designated destination apparatus from the destination apparatus;
 a requesting module that executes data stream transfer via a network to the file format converter with requesting conversion of the first file format of the data stream into the second file format so that the file format is converted on the data stream transferring path in the network to the destination apparatus, when the first file format of the data stream is different from the second file format,
 and a module that relays the data stream transfer by acquiring the data stream after the format conversion from the file format converter via a network and transferring the data to the destination apparatus,
 wherein the module that acquires the data stream acquires the data stream segment by segment, the segment being obtained by dividing the time series of the data stream in the order of streaming and converted at a time by the file format converter, and transfers the segment to the destination apparatus, while not waiting for the completion of the conversion processing for all of the data stream, and
 wherein the module that relays the data stream transfer, every time one segment of the data stream is generated at the file format converter, relays the converted segment to the data stream transferring path to the destination apparatus, while not waiting for the completion of the conversion processing for all of the data stream.

10. A computer program product allowing a computer to relay data stream transfer by transferring data stream transferred from a data source apparatus via a network to a destination apparatus designated by the data source apparatus comprising:
 a receiving module, which receives a request to convert the file format of data stream;
 a converting module, which converts the file format of the data stream in the order of data arrival from the data source apparatus so that the file format is converted on the data stream transferring path in the network to the destination apparatus, when the file format of the data stream is different from a file format that can be processed by the destination apparatus;
 a communication module, which sequentially outputs the data stream, of which the converter converts the file format, in the order of data conversion, to the destination apparatus via a network; and
 a communication module, which sequentially outputs the data stream, of which the converter converts the file format, in the order of data conversion, wherein the communication unit, every time one segment of the data stream is generated at the converting module, outputs the converted segment to the destination apparatus via a network while not waiting for the completion of the conversion processing for all of the data stream.

11. A non-transitory computer-readable recording medium having embodied thereon a program product allowing a computer to execute data stream transfer to an external apparatus, the program product comprising:
 a module that receives a data transfer request input by a user with designating a destination apparatus;
 a module that acquires a first file format of the data stream from the data stream and a second file format that can be processed by the designated destination apparatus from the destination apparatus;
 a requesting module that executes data stream transfer via a network to the file format converter with requesting conversion of the first file format of the data stream into the second file format so that the file format is converted on the data stream transferring path in the network to the destination apparatus, when the first file format of the data stream is different from the second file format,
 and a module that relays the data stream transfer by acquiring the data stream after the format conversion from the file format converter via a network and transferring the data to the destination apparatus,
 wherein the module that acquires the data stream acquires the data stream segment by segment, the segment being obtained by dividing the time series of the data stream in the order of streaming and converted at a time by the file format converter, and transfers the segment to the destination apparatus, while not waiting for the completion of the conversion processing for all of the data stream, and
 wherein the module that relays the data stream transfer, every time one segment of the data stream is generated at the file format converter, relays the converted segment to the data stream transferring path to the destination apparatus, while not waiting for the completion of the conversion processing for all of the data stream.

12. A non-transitory computer-readable recording medium having embodied thereon a program product allowing a computer to relay data stream transfer by transferring data stream transferred from a data source apparatus via a network to a destination apparatus designated by the data source apparatus, the program product comprising:
 a receiving module, which receives a request to convert the file format of data stream;
 a converting module, which converts the file format of the data stream in the order of data arrival from the data source apparatus so that the file format is converted on the data stream transferring path in the network to the destination apparatus, when the file format of the data stream is different from a file format that can be processed by the destination apparatus; and
 a communication module, which sequentially outputs the data stream, of which the converter converts the file format, in the order of data conversion, wherein the communication unit, every time one segment of the data stream is generated at the converting module, outputs the converted segment to the destination apparatus via a network while not waiting for the completion of the conversion processing for all of the data stream.

13. A data transfer system for transferring data stream to an apparatus connected to the system, comprising:
 a first processing apparatus, which executes processing of a data stream transfer to a destination apparatus; and
 a second processing apparatus, which sequentially converts a first file format of the data stream by time series sequentially in the order of streaming into a second file format that can be processed by the destination apparatus, wherein, when the first file format of the data stream is different from the second file format that can be processed by the destination apparatus, the first processing apparatus changes in a transfer route in a network so that the data stream is transferred to the destination apparatus while the file format is being converted along the way in the network, and every time one segment of the data stream is converted at the second processing apparatus, outputs the converted segment to the destination apparatus while not waiting for the completion of the conversion for all of the data stream.

14. The data transfer system according to claim 1, wherein:
the second processing apparatus is in the data stream transferring path in the network from the first processing apparatus to the destination apparatus irrespective of the first file format of the data stream, and when the first file format of the data stream is the second file format, transmits the data stream transferred from the first processing apparatus to the destination apparatus without conversion.

15. The data transfer system according to claim 1, wherein:
the first processing apparatus changes the data stream transferring path in the network toward the second processing apparatus so as to route through the second processing apparatus, when the first file format of the data stream is different from the second file format.

16. The data transfer system according to claim 1, wherein:
the conversion unit comprises a plurality of processors, which convert a plurality of units of processing of the data stream at a time in parallel, the plurality of units of processing of the data stream being obtained by dividing the time series of the data stream in the order of streaming.

17. The data transfer system according to claim 1, wherein:
the second processing apparatus is a centralized apparatus that is connected to the first processing apparatus and another apparatus via a network and receives a request thereof to improve functions of respective connected apparatuses.

* * * * *